(12) United States Patent
Fu et al.

(10) Patent No.: US 10,250,712 B2
(45) Date of Patent: Apr. 2, 2019

(54) METHOD AND SERVER OF CONFIGURING SCENARIO MODE FOR SMART DEVICES

(71) Applicant: Xiaomi Inc., Beijing (CN)

(72) Inventors: Qiang Fu, Beijing (CN); Yang Wang, Beijing (CN); Qiao Ren, Beijing (CN); Ming Zhao, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 251 days.

(21) Appl. No.: 14/791,238

(22) Filed: Jul. 2, 2015

(65) Prior Publication Data

US 2016/0127174 A1     May 5, 2016

Related U.S. Application Data

(63) Continuation of application No. PCT/CN2015/075024, filed on Mar. 25, 2015.

(30) Foreign Application Priority Data

Oct. 29, 2014    (CN) .......................... 2014 1 0594807

(51) Int. Cl.
     *H04L 12/28*      (2006.01)
     *H04L 29/08*      (2006.01)

(52) U.S. Cl.
     CPC ........ *H04L 67/306* (2013.01); *H04L 12/2809* (2013.01); *H04L 12/2829* (2013.01); *H04L 67/125* (2013.01)

(58) Field of Classification Search
     CPC ............. H04L 12/2803; H04L 12/2807; H04L 12/2809; H04L 12/281; H04L 12/2812;
(Continued)

(56) References Cited

U.S. PATENT DOCUMENTS

| 7,526,539 B1 | 4/2009 | Hsu |
| 2003/0233660 A1 | 12/2003 | Slemmer et al. |

(Continued)

FOREIGN PATENT DOCUMENTS

| CN | 101266483 A | 9/2008 |
| CN | 101833286 A | 9/2010 |

(Continued)

OTHER PUBLICATIONS

Extended European Search Report for EP Application No. 15191704.4 dated Mar. 29, 2016.
(Continued)

*Primary Examiner* — Wing F Chan
*Assistant Examiner* — Billy H Ng
(74) *Attorney, Agent, or Firm* — Jun He Law Offices P.C.; James J. Zhu

(57) ABSTRACT

The present disclosure relates to a method and a server for configuring a scenario mode. The method includes: acquiring device information of a plurality of smart device bound to a user account; pushing, according to the device information of the smart devices, at least one predefined scenario mode template to a controlling device bound to the user account; receiving, from the controlling device, scenario mode template selection information indicating a selected scenario mode template; and defining, according to the scenario mode template selection information, a scenario mode corresponding to the selected scenario mode template for the smart devices, wherein the smart devices comprise at least one first smart device and at least one second smart device, and the scenario mode represents an operation mode for controlling actions of the at least one second smart device according to a status parameter collected by the at least one first smart device.

11 Claims, 5 Drawing Sheets

(58) Field of Classification Search
CPC .............. H04L 12/2814; H04L 12/2816; H04L 67/306; H04L 12/2829; H04L 67/125
See application file for complete search history.

(56) References Cited

U.S. PATENT DOCUMENTS

| | | | |
|---|---|---|---|
| 2006/0104220 A1* | 5/2006 | Yamazaki | H04L 41/0853 370/254 |
| 2007/0061020 A1 | 3/2007 | Bovee | |
| 2007/0282944 A1 | 12/2007 | Odaka et al. | |
| 2012/0166642 A1* | 6/2012 | Saint Clair | H04L 67/125 709/225 |
| 2012/0221688 A1* | 8/2012 | Kim | H04L 41/0806 709/220 |
| 2012/0253480 A1* | 10/2012 | Abe | G08C 17/02 700/12 |
| 2013/0226316 A1* | 8/2013 | Duchene | G05B 15/02 700/17 |
| 2014/0005809 A1 | 1/2014 | Frei et al. | |
| 2014/0265875 A1 | 9/2014 | Nelson et al. | |
| 2015/0355609 A1* | 12/2015 | Warren | G05B 15/02 700/275 |
| 2016/0295397 A1* | 10/2016 | Nielsen | H04L 12/282 |

FOREIGN PATENT DOCUMENTS

| | | |
|---|---|---|
| CN | 101854672 A | 10/2010 |
| CN | 103078904 A | 5/2013 |
| CN | 103580968 A | 2/2014 |
| CN | 103955179 A | 7/2014 |
| CN | 104394044 A | 3/2015 |
| CN | 104394045 A | 3/2015 |
| EP | 2506232 A1 | 10/2012 |
| JP | 2012209879 A | 10/2012 |
| RU | 130098 U1 | 7/2013 |
| WO | 2014047501 A1 | 3/2014 |

OTHER PUBLICATIONS

International Search Report for PCT Application No. PCT/CN2015/075024 dated May 6, 2016.
Notice of Allowance for KR Application No. 10-2015-7013528 dated Jan. 26, 2017.
First Office Action for RU Application No. 2015125245 dated Jun. 17, 2016.
Decision on Grant for RU Application No. 2015125245 dated Feb. 1, 2017.

* cited by examiner

METHOD AND SERVER OF CONFIGURING SCENARIO MODE FOR SMART DEVICES

CROSS REFERENCE TO RELATED APPLICATIONS

This application is a Continuation application of International Application No. PCT/CN2015/075024 with an international filing date of Mar. 25, 2015, which is based upon and claims priority to Chinese Patent Application No. 201410594807.2, filed on Oct. 29, 2014, the entire contents of which are incorporated herein by reference.

TECHNICAL FIELD

The present disclosure relates to a field of smart home suite technologies, and more particularly, to a method and a server for configuring a scenario mode for smart devices.

BACKGROUND

Home appliances have become an essential in people's daily life. Conventional home appliances are generally remotely controlled by users through touch buttons or infra-red remote controllers. With the development of the home appliances, conventional operation modes are no longer able to meet requirements of the users for controlling the home electrical appliances.

Conforming to this trend, a concept of a smart home is proposed. The smart home uses a house as a platform, integrates facilities related to home life together by using a comprehensive wiring technology, a network communication technology, a security protection technology, an automatic control technology, an audiovisual technology, and establishes an efficient management system of the facilities related to home life and normal daily routines, thus improving safety, accessibility, comfort and artistry of the home and achieving an eco-friendly living environment. This concept has been widely considered to be an inevitable trend of the home appliances in the future.

SUMMARY

According to a first aspect of embodiments of the present disclosure, a method for configuring a scenario mode for smart devices is provided. The method includes: acquiring device information of a plurality of smart device bound to a user account; pushing, according to the device information of the smart devices, at least one predefined scenario mode template to a controlling device bound to the user account; receiving, from the controlling device, scenario mode template selection information indicating a selected scenario mode template; and defining, according to the scenario mode template selection information, a scenario mode corresponding to the selected scenario mode template for the smart devices, wherein the smart devices comprise at least one first smart device and at least one second smart device, and the scenario mode represents an operation mode for controlling actions of the at least one second smart device according to a status parameter collected by the at least one first smart device.

According to a second aspect of embodiments of the present disclosure, a server for configuring a scenario mode for smart devices is provided. The server includes a processor; and a memory configured to store instructions executable by the processor, wherein the processor is configured to perform: acquiring device information of a plurality of smart device bound to a user account; pushing, according to the device information of the smart devices, at least one predefined scenario mode template to a controlling device bound to the user account; receiving, from the controlling device, scenario mode template selection information indicating a selected scenario mode template; and defining, according to the scenario mode template selection information, a scenario mode corresponding to the selected scenario mode template for the smart devices, wherein the smart devices comprise at least one first smart device and at least one second smart device, and the scenario mode represents an operation mode for controlling actions of the at least one second smart device according to a status parameter collected by the at least one first smart device.

According to a third aspect of embodiments of the present disclosure, a non-transitory computer-readable storage medium is provided. The non-transitory computer-readable storage medium has stored therein instructions that, when executed by one or more processors of a server, cause the server to perform a method for configuring a scenario mode for smart devices. The method includes: acquiring device information of a plurality of smart device bound to a user account; pushing, according to the device information of the smart devices, at least one predefined scenario mode template to a controlling device bound to the user account; receiving, from the controlling device, scenario mode template selection information indicating a selected scenario mode template; and defining, according to the scenario mode template selection information, a scenario mode corresponding to the selected scenario mode template for the smart devices, wherein the smart devices comprise at least one first smart device and at least one second smart device, and the scenario mode represents an operation mode for controlling actions of the at least one second smart device according to a status parameter collected by the at least one first smart device.

The technical solutions provided in the embodiments of the present disclosure may achieve the following beneficial effects:

The present disclosure provides a method for configuring a scenario mode for smart devices. Several scenario mode templates are predefined on a server, and each scenario mode template corresponds to a scenario mode. The server determines, according to acquired device information of a smart device bound to a user account, a scenario mode template suitable for the user account, and pushes the matched scenario mode template to a controlling device bound to the user account. The scenario mode is finally defined according to selection via the user account. With the method for configuring a scenario mode, a user may conveniently and quickly configure a scenario mode, thereby reducing inconvenience in defining a specific scenario mode.

It shall be appreciated that the above general description and the detailed description hereinafter are only illustrative, but not for limiting the present disclosure.

BRIEF DESCRIPTION OF THE DRAWINGS

To clearly describe embodiments of the present disclosure, drawings that are to be referred for description of the embodiments are briefly described hereinafter. Apparently, the drawings described hereinafter merely illustrate some embodiments of the present disclosure. Persons of ordinary skill in the art may also derive other drawings based on the drawings described herein without any creative effort.

The above drawings are used for illustrating the embodiments of the present disclosure, and more details will be given hereinafter. These drawings and textual descriptions are not intended to limit the scope defined in the present disclosure in any way, but intended to describe the inventive concept of the present disclosure, through specific embodiments, for a person skilled in the art.

DETAILED DESCRIPTION

To make the objectives, technical solutions, and advantages of the present disclosure clearer, the present disclosure is further described in detail with reference to the accompany drawings. Apparently, embodiments described herein are merely some exemplary ones, rather than all the embodiments of the present disclosure. Based on the embodiments of the present disclosure, all other embodiments derived by persons of ordinary skill in the art without any creative efforts shall fall within the protection scope of the present disclosure.

Embodiments are associated with a smart suite network system comprising a controlling device, a plurality of smart devices and a server. Firstly, it should be noted that, in various embodiments of the present disclosure, the controlling device may be an electronic device selecting from a group of phones, tablet computers, e-book readers, MP3 players (Moving Picture Experts Group Audio Layer III), MP4 players (Moving Picture Experts Group Audio Layer IV), portable laptops, and desktop computers and etc.

The controlling device may be one of the plurality of smart devices. Alternatively, the controlling device can also be a separate device besides the plurality of smart devices. For example, the smart devices may comprise a smart sockets, smart cameras, smart TVs and smart air conditioners in a smart home suite system. In one embodiment, the controlling device may be the smart TV among the home appliances. In other embodiments, the controlling device may be not one of the home appliances but a mobile phone. The controlling device and the plurality of smart devices are connected to the server by an external communication network. Moreover, the controlling device and the plurality of smart devices can be registered under a same user account. The server stores the registration information, user account information, device information of the controlling device and the plurality of smart devices and other necessary information to manage the controlling device and the plurality of smart devices.

Accordingly, the present disclosure provides a method of utilizing a user to select some operation mode to monitor or obtain status parameters of the plurality of smart devices in the smart suite network system. Moreover, control operations can be conducted based on the monitoring results according to the operation mode.

Figure 1:
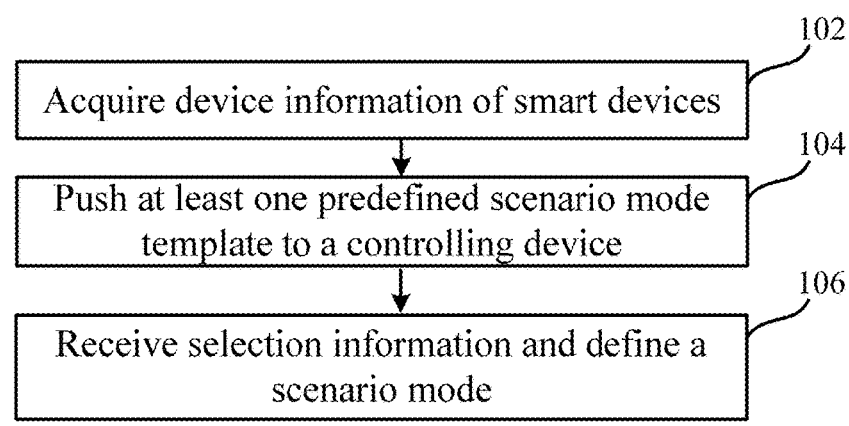
FIG. 1 is a flowchart illustrating a method for configuring a scenario mode for smart devices according to an exemplary embodiment of the present disclosure.

FIG. 1 is a flowchart illustrating a method for configuring a scenario mode for smart devices according to an exemplary embodiment of the present disclosure. In this embodiment, take the method being implemented by the server as an example to illustrate. The method includes the following steps.

In step 102, device information of a plurality of smart device bound to a user account is acquired.

In step 104, according to the device information of the plurality of smart devices, at least one predefined scenario mode template is pushed to the user account.

Herein the smart devices comprise at least one first smart device and at least one second smart device, and the scenario mode represents an operation mode for controlling actions of the at least one second smart device according to a status parameter collected by the at least one first smart device.

In step 106, scenario mode template selection information indicating a selected scenario mode template is received from the controlling device. Moreover, a scenario mode corresponding to the selected scenario mode template for the smart devices is defined according to the scenario mode template selection information.

In conclusion, this embodiment provides a method for configuring a scenario mode for smart devices. Different smart devices may be associated by using scenario modes as media, such that the different smart devices achieve automatic linkage control based on an associated relationship defined for the scenario modes. According to the method for configuring a scenario mode, several scenario mode templates are predefined on a server, and each scenario mode template corresponds to a scenario mode. The server determines, according to acquired device information of a smart device bound to a user account, at least one scenario mode template suitable for the user account, and pushes the matched scenario mode template to the user account. The scenario mode is finally defined according to selection via the user account. According to the method for configuring a scenario mode, a user may conveniently and quickly configure a scenario mode, thereby reducing inconvenience in defining a specific scenario mode.

It should be noted that the scenario mode template may be predefined on a server for a user to select, or may be a scenario mode template uploaded by another user, which implements scenario mode sharing between users.

The smart device cited in this embodiment may be a smart home appliance or gadget. However, it should be noted that, the smart device cited in this embodiment does not be limited to a smart home appliance or gadget, it can include any device, component, furniture, tool, machine, car, or other things which can be electronically controlled and connected to a local or internet network.

In this embodiments, the smart devices comprise at least one first smart device and at least one second smart device, and the scenario mode is configured to indicate an operation mode for controlling actions of the at least one second smart device according to a status parameter collected by the at least one first smart device. By establishing the scenario mode bound to the user account in the server, an automatic control of the at least one second smart device may be realized.

Moreover, the server establishes the scenario mode by using a scenario mode configuration. In some embodiments, the scenario mode configuration at least comprises parameters selected from: user account information, the device information of the smart devices, a startup condition parameter for defining conditions of triggering the scenario mode, and a task parameter for defining actions to be performed in the scenario mode.

User account information represents information of the use account. In the present disclosure, the controlling device and the smart devices are registered under a same user account. The user account is identified by the server by using the user account information such as a user name (login name, screen name or nickname), a phone number of the user, or an email address of the user and etc.

As for the device information of the smart devices, in the present disclosure, it includes: device information of the at least one first smart device bound to the user account and device information of the at least one second smart device bound to the user account. The device information includes device ID information and device type information. The device ID information may be a MAC (Media Access Control) address, an IP address, a device serial number and the like. The device type information indicates different types of the devices, such as smart sockets, smart cameras, smart TVs, smart air conditioners, and etc. As for different types of devices, different status parameters are collected and different control instructions are sent by the server.

The startup condition is the status parameter collected by the at least one first smart device and set as a condition for triggering the scenario mode. The status parameter collected by the devices may be different since the device types are different. For example, the smart socket may collect a current ON/OFF state of the smart socket, the smart camera may collect whether there is a moving object within the monitoring range, the smart air conditioner may collect a current indoor temperature and a current ON/OFF state of the smart air conditioner, etc. All these status parameters may be used as the status parameter collected by the first smart device.

The task is a corresponding control instruction configured to be sent to the at least one second smart device if the scenario mode is triggered. The corresponding control instructions may be different since the device types are different. For example, the smart socket may control the ON/OFF status of the smart socket, the smart air conditioner may control the ON/OFF status of the smart air conditioner and the set temperature, etc.

Corresponding to the scenario mode, the scenario mode templates according to the present disclosure are several scenario mode templates predefined on a server side, whose startup conditions and tasks have been configured, such that a user may directly define scenario modes for a smart device bound to his or her user account based on the templates.

Based on such disclosure, the scenario mode template at least includes: device type information of a bound smart device, and the startup condition and the task of the corresponding scenario mode; the device type information of the bound smart device includes: device type information of at least one first smart device and at least one second smart device in the corresponding scenario mode.

The at least one first smart device is a smart device in the scenario mode configured to execute the startup conditions, and the at least one second smart device is a smart device in the scenario mode configured to execute the tasks.

Accordingly, in the scenario mode template, the majority of content of the corresponding scenario mode has been predefined, and only the user account information and the device ID information of the device information of the bound smart device are not provided. During recommending a corresponding scenario mode to a user account, the method for configuring a scenario mode automatically supplements the above not-provided content for the user, that is, defining the scenario mode bound to the user account is completed.

In this embodiment, the device information includes the device ID information and the device type information. Since different types of smart devices may provide different status parameter as the startup conditions, they are corresponding to different control instructions. According to the device information obtained, the server may obtain at least one of predefined scenario mode template corresponding to the acquired device type.

Moreover, in another embodiment, the method of configuring a scenario mode for smart devices may further includes a step of obtaining user account information of the user account. Accordingly, the scenario mode is established based on the obtained user account information, the device information of the at least one first smart device and the at least one second smart device.

In this embodiment, the scenario mode template is defined according to the type of the smart device. Different types of smart devices may provide different status parameter as the startup conditions, and correspond to different control instructions. Therefore, a certain scenario mode template is only applicable with respect to a specific type of smart device; otherwise, the scenario mode template may not be used. Just based on this, this embodiment provides a scenario mode template recommending method. Firstly, the device information of the smart device bound to the user account is acquired, and thus the user's currently available device type is acquired. Then, the scenario mode templates are screened in a scenario mode template library according to the device type information. Only when the first smart device and the second smart device in the scenario mode template are simultaneously bound to the user, the scenario mode template is pushed to the controlling device bound to the user account. When the user makes a selection, since the device ID information is acquired according to the device information of the smart device, the server may define the scenario mode bound to the user account according to the scenario mode template selected by the user. The user account information of the scenario mode is the user account information uploaded in step 102, the device information of the first smart device and the second smart device is device information of the corresponding types of smart devices in the scenario mode template, and the startup conditions and the tasks are predefined in the scenario mode template.

Figure 2A:
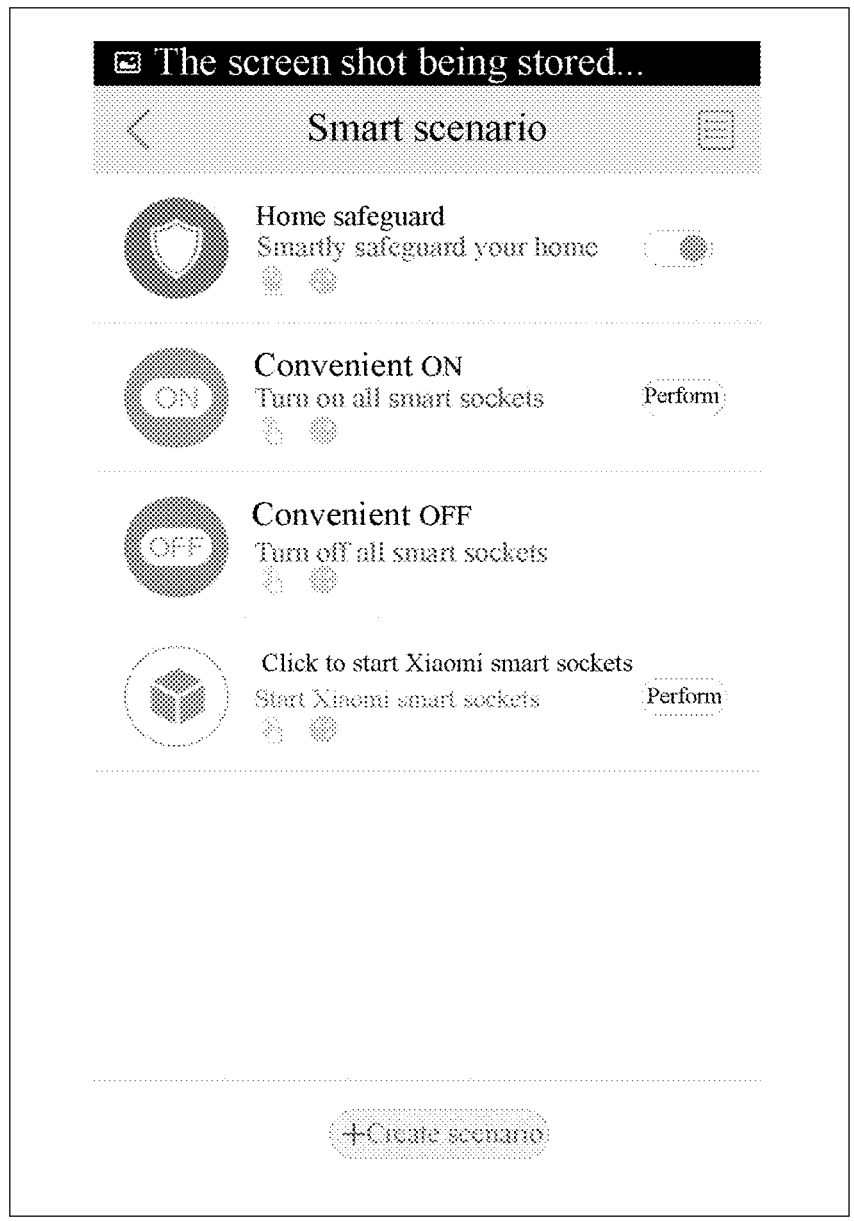
FIG. 2A is a schematic diagram illustrating an interface of a controlling device for user to configure a scenario mode according to an exemplary embodiment of the present disclosure.
Figure 2B:
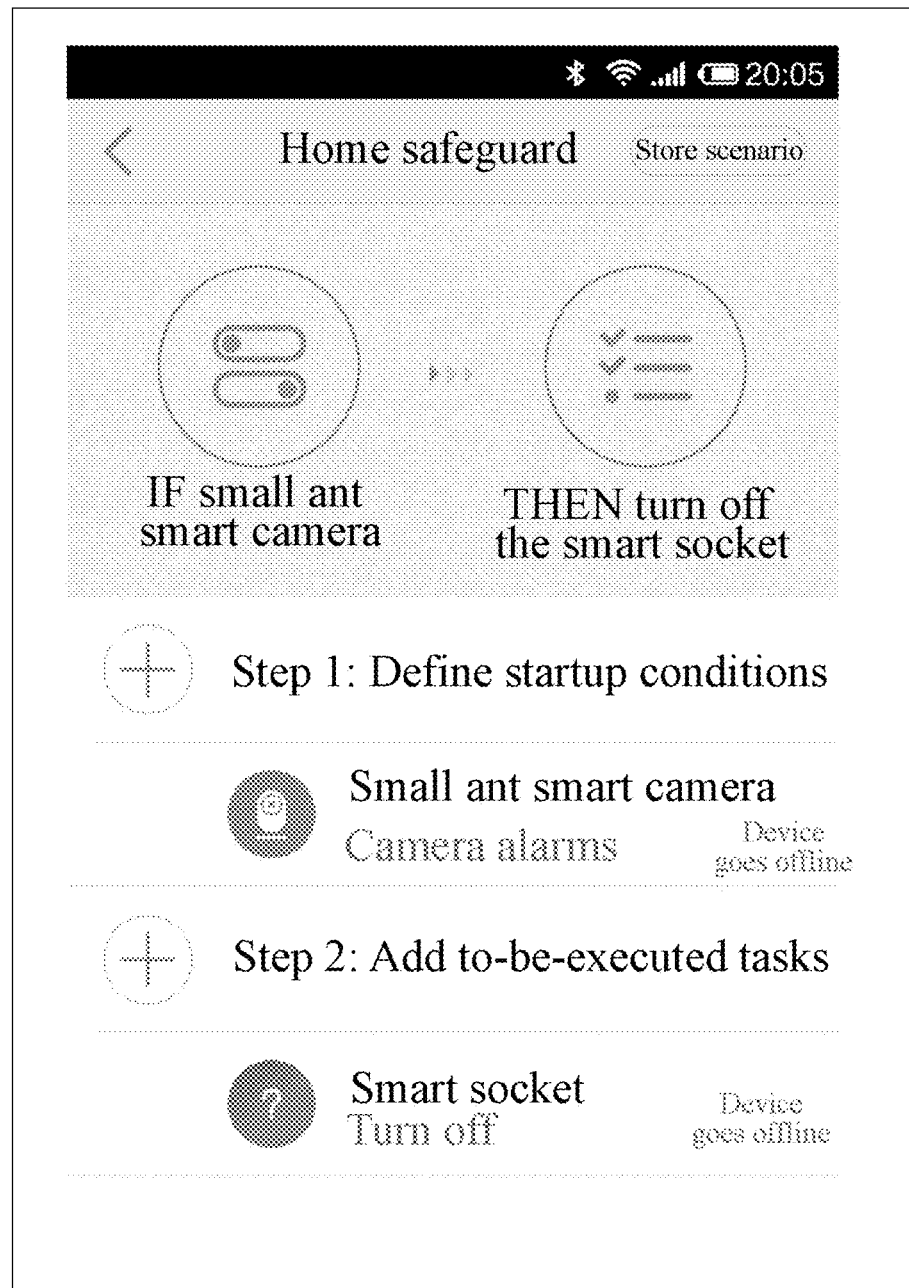
FIG. 2B is another schematic diagram illustrating an interface of the controlling device for user to configure a scenario mode according to an exemplary embodiment of the present disclosure.

FIGS. 2A and 2B are schematic diagrams illustrating an interface of the controlling device for user to configure a scenario mode according to an exemplary embodiment of the present disclosure. As illustrated in FIGS. 2A and 2B, in this embodiment, an example of configuring a "home safeguard" scenario mode is given. The "home safeguard" scenario mode is a scenario mode template defined by a server. In the scenario mode template, it is defined that a first smart device type is "small ant smart camera", a second smart device type is "smart socket", a startup condition is "camera alarming", and a task (also called a "to-be-executed task") is "turning off the smart socket". After a user account is bound to a smart device, the server acquires device type information of the smart device bound to the user account, and determines whether the user account is bound to the "small ant smart camera" and the "smart socket". When the user account is simultaneously bound to these two types of smart devices, the server pushes the matched "home safeguard" scenario mode template to a user according to a search result. As illustrated in FIG. 2A, the user does not need to specifically configure the scenario mode, but needs to select to enable or disable the scenario mode. If the user selects to enable the "home safeguard" scenario mode, the "home safeguard" scenario mode may be automatically defined by configuration according to device information of the corresponding smart device bound to the user account, thereby implementing a linkage control relation between the "small ant smart camera" and the "smart socket" bound to the user account.

Figure 3:
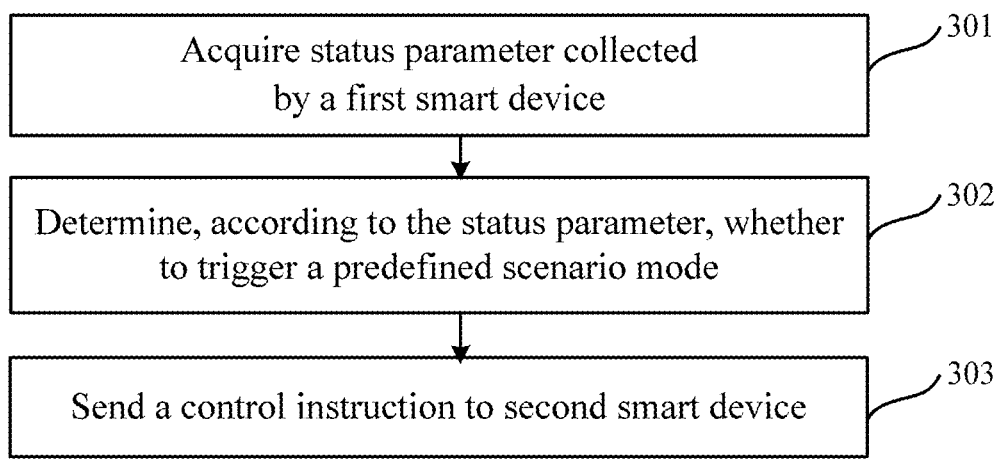
FIG. 3 is a flowchart illustrating a method for controlling smart devices based on a scenario mode according to an exemplary embodiment of the present disclosure.
Figure 4:
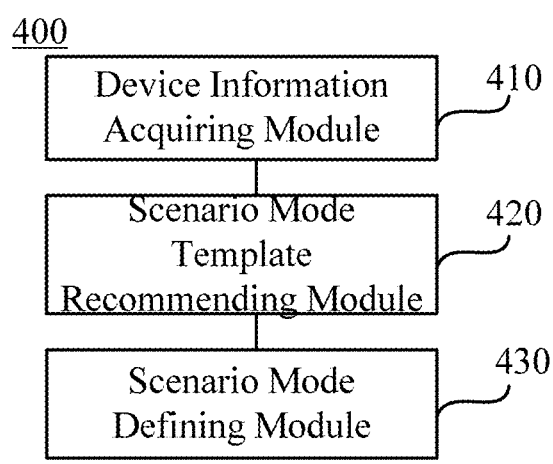
FIG. 4 is a schematic diagram illustrating an apparatus for configuring a scenario mode for smart devices according to an exemplary embodiment of the present disclosure.

FIG. 3 is a flowchart illustrating a method for controlling smart devices based on a scenario mode according to an exemplary embodiment of the present disclosure. In this embodiment, take the method being used in a server as an example. Referring to FIG. 4, the method for controlling a smart device based on a scenario mode includes the following steps.

In step 301, status parameter collected by at least one first smart device bound to a user account is acquired.

In step 302, it is determined, according to the status parameter, whether to trigger a predefined scenario mode, wherein the scenario mode is configured to store an associated relationship for triggering operation control for at least one second smart device according to the status parameter collected by the at least one first smart device.

In step 303, if it is determined to trigger the scenario mode, a corresponding control instruction is sent to at least one second smart device bound to the user account according to the scenario mode, to control the second smart device to perform a corresponding operation.

In conclusion, the smart device control method according to this embodiment associates different smart devices by using scenario modes pre-stored on a cloud server as media, such that the different smart devices achieve automatic linkage control based on an associated relationship defined for the scenario modes. With the smart device control method, originally independent smart devices may be associated, and the application scenarios of the smart devices may be extended via a combination of the smart devices.

The smart device according to this embodiment is a smart home device. It should be noted that the smart device control method has great extensibility and compatibility, and any smart device capable of connecting to the Internet may all be applied to the smart device control method according to this embodiment.

The scenario mode at least includes: user account information, device information of a bound smart device, a startup condition, and a task.

The device information of the bound smart device includes device information of at least one first smart device and at least one second smart device that are bound to the user account; and the device information may include: device ID information and device type information. The device ID information may be a MAC address, an IP address, a serial number, or the like of the device. The device type information may be information indicative of the type of a device. For example, a smart socket, a smart camera, a smart TV, a smart air conditioner, or the like. Accordingly, different types of devices may collect different status parameter, and correspond to different control instructions.

The startup condition is status parameter collected by the at least one first smart device which is a condition predefined for triggering the scenario mode. The collected status parameter may vary depending on different device types. For example, a smart socket may collect current ON/OFF status of the socket, a smart camera may collect information indicating whether a moving object is present in a monitoring range, and a smart air conditioner may collect current indoor temperature and ON/OFF status and the like of the air conditioner. These status parameters may all be used as the status parameter collected by the first smart device.

The task is a predefined corresponding control instruction sent to the at least one second smart device when the scenario mode is triggered. The corresponding control instructions may vary depending on different device types. For example, a smart socket may control ON/OFF status of the socket, and a smart air conditioner may control ON/OFF status, defined temperatures, and the like of the air conditioner.

In this embodiment, there may be a plurality of first smart devices in the scenario mode. The status parameter corresponding to each first smart device may be used as one factor in the staring conditions which are used to determine whether to trigger the scenario mode. Herein, in the case of multiple first smart devices, it may be determined whether the scenario mode is trigged in two ways.

Way 1:

The scenario mode further includes a startup condition logic conjunction. The startup condition logic conjunction is configured to represent a logic conjunction between status parameter collected by each first smart device and to be used as the condition for triggering the scenario mode. The logic conjunction, may be a logic "AND" or a logic "OR" or a logical expression composed of the logic "AND" and the logic "OR".

Determining whether a preset scenario mode is triggered according to the status parameter includes: determining whether a logic conjunction between the status parameter collected by each first smart device meets the startup condition logic conjunction according to the status parameter, wherein if the logic conjunction between the status parameter collected by each first smart device meets the startup condition logic conjunction, the preset scenario mode is triggered.

With this method, the status parameter collected by each smart device may be used as the one factor of determining whether to trigger the scenario mode. The basis of determining whether to trigger the scenario mode may be established through establishing the logical expressions between various factors.

Way 2:

The scenario mode further includes a condition-task correspondence table, and at least one group of corresponding relationship between the startup condition and the task is stored in the condition-task correspondence table.

Determining whether a preset scenario mode is triggered according to the status parameter includes: determining whether the status parameter collected by at least one first smart device meets at least one group of startup condition in the condition-task correspondence table according to the status parameter.

If the status parameter collected by at least one first smart device meets at least one group of startup condition in the condition-task correspondence table, the task corresponding to the at least one group of startup condition is triggered according to the condition-task correspondence table.

With this method, the condition-task correspondence table may be established in the scenario mode to determine the corresponding relationship between the startup condition and the task. With the correspondence table, different startup conditions and different tasks may be managed.

Apparatus embodiments of the present disclosure are described hereinafter, wherein the apparatuses may be used to perform the method embodiments. Details that are not disclosed in the apparatus embodiments of the present disclosure, reference may be made to the method embodiments of the present disclosure.

FIG. 4 is a schematic diagram illustrating an apparatus for configuring a scenario mode for smart devices according to an exemplary embodiment of the present disclosure. The recommending apparatus may be implemented via software, hardware or a combination of software and hardware as all or a part of an electronic device. The configuring a scenario mode apparatus 400 for a smart device may include: a device information acquiring module 410, a scenario mode template recommending module 420, and a scenario mode defining module 430.

The device information acquiring module 410 is configured to acquire device information of a plurality of smart devices bound to a user account.

The scenario mode template recommending module 420 is configured to push, according to the device information of the plurality of smart devices, at least one predefined scenario mode template to a controlling device bound to the user account.

The scenario mode defining module 430 is configured to receive from the controlling device, scenario mode template selection information indicating a selected scenario mode template; and define according to the scenario mode template selection information a scenario mode corresponding to the selected scenario mode template for the smart devices.

In conclusion, this embodiment provides an apparatus for configuring a scenario mode for smart devices. Different smart devices may be associated by using the scenario modes as media, such that the different smart devices achieve automatic linkage control based on an associated relationship defined for the scenario modes. According to the apparatus, several scenario mode templates are predefined on a server, and each scenario mode template corresponds to a scenario mode. The server determines, according to acquired device information of a smart device bound to a user account, a scenario mode template suitable for the user account, and pushes the matched scenario mode template to the user account. The scenario mode is finally defined according to selection via the user account. With the apparatus, a user may conveniently and quickly configure a scenario mode, thereby reducing inconvenience in defining a specific scenario mode.

Figure 5:
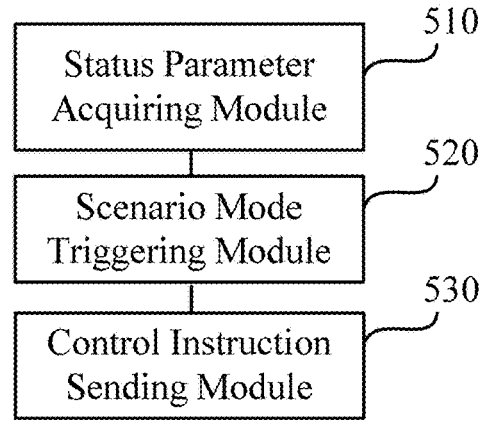
FIG. 5 is a schematic diagram illustrating an apparatus for controlling smart devices based on a scenario mode according to an exemplary embodiment of the present disclosure.

FIG. 5 is a schematic diagram illustrating an apparatus for controlling smart devices based on a scenario mode according to an exemplary embodiment of the present disclosure. The smart device control apparatus may be implemented via software, hardware or a combination of software and hardware as all or a part of an electronic device. The smart device control apparatus 500 based on a scenario mode may include: a status parameter acquiring module 510, a scenario mode triggering module 520, and a control instruction sending module 530.

The status parameter acquiring module 510 is configured to acquire status parameter collected by at least one first smart device bound to a user account.

The scenario mode triggering module 520 is configured to determine, according to the status parameter, whether to trigger a predefined scenario mode, the scenario mode being configured to store an associated relationship for triggering operation control for at least one second smart device according to the status parameter collected by the at least one first smart device.

The control instruction sending module 530 is configured to: if it is determined to trigger the scenario mode, send a corresponding control instruction to at least one second smart device bound to the user account according to the scenario mode, to control the second smart device to perform a corresponding operation.

In conclusion, the apparatus for controlling smart devices according to this embodiment associates different smart devices by using pre-stored scenario modes as media, such that the different smart devices achieve automatic linkage control based on an associated relationship defined for the scenario modes. With the smart device control apparatus, originally independent smart devices may be associated, and the application scenarios of the smart devices may be extended via a combination of the smart devices.

Figure 6:
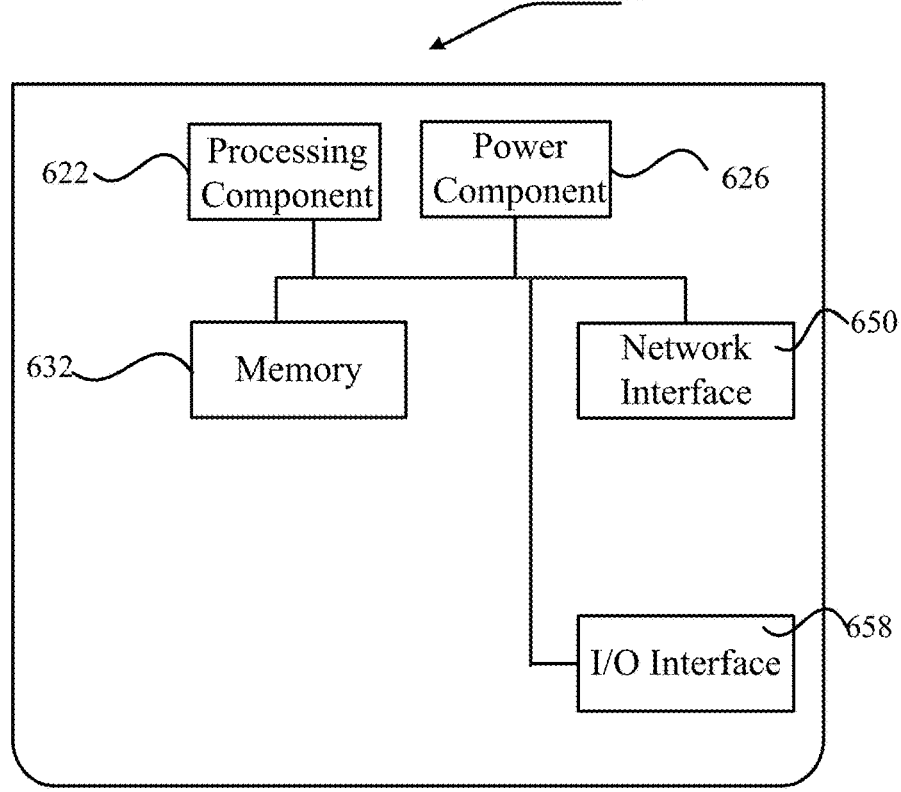
FIG. 6 is a block diagram illustrating a server according to an exemplary embodiment of the present disclosure.

FIG. 6 is a block diagram illustrating a server 600 for configuring a scenario mode for smart devices according to an exemplary embodiment of the present disclosure. Referring to FIG. 6, the server 600 includes a processing component 622, which further includes one or more processors, and memory resources represented by a memory 632, configured to store instructions executable by the processing component 622, for example, applications. The applications stored in the memory 632 may include one or more than one module each corresponding to a group of instructions. In addition, the processing component 622 is configured to execute the instructions, to perform the above methods.

The server 600 may further include: a power component 626, configured to perform power management in the server 600; a wired or wireless network interface 650, configured to connect the server 600 to the network; and an input/output (I/O) interface 658. The server 600 may operate an operating system stored in the memory 632, for example, Windows Server™, Mac OS X™, Unix™, Linux™, FreeBSD™, or the like.

A non-transitory computer-readable storage medium is provided. When instructions stored in the storage medium are executed by a processor of the server 600, the server 600 is caused to perform a method for configuring a scenario mode as illustrated in FIG. 1.

A non-transitory computer-readable storage medium is provided. When instructions stored in the storage medium are executed by a processor of the server 600, the server 600 is caused to perform a smart device control method as illustrated in FIG. 3.

Other embodiments of the present disclosure will be apparent to those skilled in the art from consideration of the specification and practice disclosed herein. This application is intended to cover any variations, uses, or adaptations of the present disclosure following the general principles thereof and including such departures from the present disclosure as coming within common knowledge or customary technical means in the art. It is intended that the specification and embodiments be considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes can be made without departing from the scope thereof. The scope of the present disclosure is only defined by the appended claims.

What is claimed is:

1. A method for configuring a scenario mode for smart devices, comprising:
    acquiring device information of a first smart device and a second smart device bounded to a user account;
    pushing, according to the device information of the first and second smart devices, a predefined scenario mode template to a controlling device bound to the user account, wherein the predefined scenario mode template corresponds to a scenario mode which associates at least one startup condition for the first smart device to trigger the scenario mode with at least one task to be performed by the second smart device when the scenario mode is triggered;
    receiving, from the controlling device, scenario mode template selection information indicating whether a user selects to enable the predefined scenario mode template;
    bounding, when the scenario mode template selection information indicates the predefined scenario mode template is enabled, the scenario mode corresponding to the predefined scenario mode template to the user account and configuring the scenario mode according to the device information of the first and second smart devices; and
    performing, by the second smart device, the at least one task of the scenario mode when the at least one startup condition is satisfied;
    wherein the scenario mode bounded to the user account is configured with parameters selected from: user account information, device type information of the first and second smart devices, device ID information of the first and second smart devices, a startup condition parameter for defining conditions of triggering the scenario mode, and a task parameter for defining actions to be performed in the scenario mode;
    wherein the predefined scenario mode template comprises: the device type information of the first smart devices and the second smart devices, the startup condition parameter for defining conditions of triggering the corresponding scenario mode, and the task parameter for defining actions to be performed in the corresponding scenario mode; and
    wherein bounding the scenario mode corresponding to the predefined scenario mode template to the user account comprises defining the scenario mode corresponding to the predefined scenario mode template by supplementing the device ID information of the first smart device and the second smart device and the user account information to the predefined scenario mode template.

2. The method according to claim 1, wherein the startup condition parameter comprises a status parameter collected by the first smart device for triggering the scenario mode; and
    wherein the task parameter comprises a predefined control instruction to be sent to the second smart device when the scenario mode is triggered.

3. The method according to claim 2, further comprising: acquiring the user account information for the user account.

4. The method according to claim 1, wherein pushing a predefined scenario mode template comprises:
    selecting a scenario mode template matching with the device type information of the smart devices according to the acquired device type information of the first and second smart devices; and
    sending the predefined scenario mode template to the controlling device.

5. The method according to claim 1, further comprising:
    acquiring a status parameter collected by the first smart device;
    determining, according to the status parameter, whether to trigger the scenario mode bounded to the user account; and
    sending a control instruction to the second smart device for controlling actions of the second smart device, if it is determined to trigger the scenario mode bounded to the user account.

6. A server for configuring a scenario mode for smart devices, comprising:
    a processor; and
    a memory configured to store instructions executable by the processor,
    wherein the processor is configured to perform:
    acquiring device information of a first smart device and a second smart device bounded to a user account;
    pushing, according to the device information of the first and second smart devices, a predefined scenario mode template to a controlling device bound to the user account, wherein the predefined scenario mode template corresponds to a scenario mode and associates at least one startup condition for the first smart device to trigger the scenario mode with at least one task to be performed by the second smart device when the scenario mode is triggered;
    receiving, from the controlling device, scenario mode template selection information indicating whether a user selects to enable the predefined scenario mode template;
    bounding, when the scenario mode template selection information indicates the predefined scenario mode template is enabled, the scenario mode corresponding to the predefined scenario mode template to the user account and configuring the scenario mode according to the device information of the first and second smart devices; and
    performing, by the second smart device, the at least one task of the scenario mode when the at least one startup condition is satisfied;
    wherein the scenario mode bounded to the user account is configured with parameters selected from: user account information, device type information of the first and second smart devices, device ID information of the first and second smart devices, a startup condition parameter for defining conditions of triggering the scenario mode, and a task parameter for defining actions to be performed in the scenario mode;
    wherein the predefined scenario mode template comprises: the device type information of the first smart devices and the second smart devices, the startup condition parameter for defining conditions of triggering the corresponding scenario mode, and the task parameter for defining actions to be performed in the corresponding scenario mode; and
    wherein bounding the scenario mode corresponding to the predefined scenario mode template to the user account comprises defining the scenario mode corresponding to the predefined scenario mode template by supplementing the device ID information of the first smart device and the second smart device and the user account information to the predefined scenario mode template.

7. The server according to claim 6, wherein the startup condition parameter comprises a status parameter collected by the first smart device for triggering the scenario mode; and wherein the task parameter comprises a predefined control instruction to be sent to the second smart device when the scenario mode is triggered.

8. The server according to claim 7, wherein the processor is configured to perform: acquiring the user account information for the user account.

9. The server according to claim 6, wherein pushing a predefined scenario mode template comprises:
selecting a scenario mode template matching with the device type information of the smart devices according to the acquired device type information of the first and second smart devices; and
sending the predefined scenario mode template to the controlling device.

10. The server according to claim 6, wherein the processor is configured to perform:
acquiring a status parameter collected by the first smart device;
determining, according to the status parameter, whether to trigger the scenario mode bounded to the user account; and
sending a control instruction to the second smart device for controlling actions of the second smart device, if it is determined to trigger the scenario mode bounded to the user account.

11. A non-transitory computer-readable storage medium having stored therein instructions that, when executed by one or more processors of a server, cause the server to perform a method for configuring a scenario mode for smart devices, the method comprising:
acquiring device information of a first smart device and a second smart device bounded to a user account;
pushing, according to the device information of the first and second smart devices, a predefined scenario mode template to a controlling device bound to the user account, wherein the predefined scenario mode template corresponds to a scenario mode and associates at least one startup condition for the first smart device to trigger the scenario mode with at least one task to be performed by the second smart device when the scenario mode is triggered;
receiving, from the controlling device, scenario mode template selection information indicating whether a user selects to enable the predefined scenario mode template;
bounding, when the scenario mode template selection information indicates the predefined scenario mode template is enabled, the scenario mode corresponding to the predefined scenario mode template to the user account and configuring the scenario mode according to the device information of the first and second smart devices; and
performing, by the second smart device, the at least one task of the scenario mode when the at least one startup condition is satisfied;
wherein the scenario mode bounded to the user account is configured with parameters selected from: user account information, device type information of the first and second smart devices, device ID information of the first and second smart devices, a startup condition parameter for defining conditions of triggering the scenario mode, and a task parameter for defining actions to be performed in the scenario mode;
wherein the predefined scenario mode template comprises: the device type information of the first smart devices and the second smart devices, the startup condition parameter for defining conditions of triggering the corresponding scenario mode, and the task parameter for defining actions to be performed in the corresponding scenario mode; and
wherein bounding the scenario mode corresponding to the predefined scenario mode template to the user account comprises defining the scenario mode corresponding to the predefined scenario mode template by supplementing the device ID information of the first smart device and the second smart device and the user account information to the predefined scenario mode template.

* * * * *